(12) United States Patent
Tsukamoto

(10) Patent No.: US 8,339,691 B2
(45) Date of Patent: Dec. 25, 2012

(54) PROFILE CREATION METHOD AND PROFILE CREATION APPARATUS

(75) Inventor: Keiko Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 12/465,082

(22) Filed: May 13, 2009

(65) Prior Publication Data

US 2009/0284812 A1 Nov. 19, 2009

(30) Foreign Application Priority Data

May 14, 2008 (JP) ................................. 2008-127378

(51) Int. Cl.
*G03F 3/08* (2006.01)

(52) U.S. Cl. ......... 358/518; 358/1.9; 358/501; 358/504; 356/402

(58) Field of Classification Search .................. None
See application file for complete search history.

(56) References Cited

U.S. PATENT DOCUMENTS

| | | | | |
|---|---|---|---|---|
| 6,020,959 | A * | 2/2000 | Imura | 356/319 |
| 6,026,216 | A * | 2/2000 | Ohtsuka et al. | 358/1.9 |
| 6,075,614 | A * | 6/2000 | Ohtsuka et al. | 358/1.1 |
| 6,717,672 | B2 * | 4/2004 | Tamagawa | 356/402 |
| 6,750,442 | B2 * | 6/2004 | Bala et al. | 250/226 |
| 7,027,067 | B1 * | 4/2006 | Ohga | 345/589 |
| 7,574,040 | B2 * | 8/2009 | Ito et al. | 382/167 |
| 7,688,486 | B2 * | 3/2010 | Gießelmann | 358/504 |
| 7,800,785 | B2 * | 9/2010 | Bala et al. | 358/3.28 |
| 7,821,639 | B2 * | 10/2010 | Ehbets et al. | 356/402 |
| 7,830,514 | B2 * | 11/2010 | Vogh, Jr. | 356/402 |
| 7,999,822 | B2 * | 8/2011 | Ishii | 345/589 |
| 7,999,978 | B2 * | 8/2011 | Nakamura et al. | 358/518 |
| 8,044,965 | B2 * | 10/2011 | Suzuki | 345/581 |
| 8,049,924 | B2 * | 11/2011 | Mestha et al. | 358/1.9 |
| 8,064,100 | B2 * | 11/2011 | Braun et al. | 358/1.9 |
| 8,081,819 | B2 * | 12/2011 | Ohga | 382/167 |
| 8,085,438 | B2 * | 12/2011 | Hersch et al. | 358/3.09 |
| 8,111,430 | B2 * | 2/2012 | Kodama | 358/3.24 |
| 2007/0058186 | A1 * | 3/2007 | Tanaka | 358/1.9 |
| 2007/0146469 | A1 * | 6/2007 | Takizawa et al. | 347/212 |
| 2008/0239348 | A1 * | 10/2008 | Kawai | 358/1.9 |
| 2010/0202002 | A1 * | 8/2010 | Engler et al. | 358/1.9 |

FOREIGN PATENT DOCUMENTS

| | | |
|---|---|---|
| JP | 2001-174334 | 6/2001 |
| JP | 2002-139381 | 5/2002 |

* cited by examiner

*Primary Examiner* — King Poon
*Assistant Examiner* — Ted Barnes
(74) *Attorney, Agent, or Firm* — Cowan, Liebowitz & Latman, P.C.

(57) ABSTRACT

A profile creation apparatus determines whether a medium used for printing contains a fluorescent brightener, based on measured values of the medium, corrects measured values of color patches formed on the medium, based on a result of the determination, and creates a color profile based on the corrected measured values of the color patches and measured values of a viewing environment in which color patches have been formed.

11 Claims, 11 Drawing Sheets

FIG. 9

```
START
  ↓
ACQUIRE CORRECTED COLOR PATCH DATA — S901
  ↓
ACQUIRE VIEWING ENVIRONMENT INFORMATION — S902
  ↓
CALCULATE XYZ VALUES OF ALL PATCHES — S903
  ↓
CALCULATE LAB VALUES OF ALL PATCHES — S904
  ↓
CREATE PROFILE — S905
  ↓
END
```

FIG. 10

$$X = k \int_{380}^{780} O(\lambda) S(\lambda) \bar{x}(\lambda) d\lambda$$

$$Y = k \int_{380}^{780} O(\lambda) S(\lambda) \bar{y}(\lambda) d\lambda$$

$$Z = k \int_{380}^{780} O(\lambda) S(\lambda) \bar{z}(\lambda) d\lambda$$

k : ARBITRARY CONSTANT
$\bar{x}(\lambda), \bar{y}(\lambda), \bar{z}(\lambda)$ : COLOR MATCHING FUNCTION

FIG. 11

$$L^* = 116(Y/Y_n)^{\frac{1}{3}} - 16$$

$$a^* = 500\left\{(X/X_n)^{\frac{1}{3}} - (Y/Y_n)^{\frac{1}{3}}\right\}$$

$$b^* = 200\left\{(Y/Y_n)^{\frac{1}{3}} - (Z/Z_n)^{\frac{1}{3}}\right\}$$

WHERE $Y/Y_n > 0.008856$
$X/X_n > 0.008856$
$Z/Z_n > 0.008856$

FIG. 12

| | |
|---|---|
| LUT GRID COMPONENT DATA | R VALUE INTERVALS : 0, 32, 64, ... , 224, 255 |
| | G VALUE INTERVALS : 0, 32, 64, ... , 224, 255 |
| | B VALUE INTERVALS : 0, 32, 64, ... , 224, 255 |
| LUT GRID POINT DATA | L*a*b* COORDINATES OF Grid (0, 0, 0) : (30, 0, −2) |
| | L*a*b* COORDINATES OF Grid (0, 0, 1) : (31, 2, −9) |
| | ⋮ |
| | L*a*b* COORDINATES OF Grid (0, 0, 8) : (34, 18, −33) |
| | L*a*b* COORDINATES OF Grid (0, 1, 0) : (34, −8, 0) |
| | ⋮ |
| | L*a*b* COORDINATES OF Grid (8, 8, 7) : (90, −4, 12) |
| | L*a*b* COORDINATES OF Grid (8, 8, 8) : (92, 0, 0) | ns
PROFILE CREATION METHOD AND PROFILE CREATION APPARATUS

BACKGROUND OF THE INVENTION

1. Field of the Invention

The present invention relates to a technique for creating color profiles.

2. Description of the Related Art

Recently, in addition to personal computers, peripheral devices such as color printers, digital cameras, and digital video devices, as well as digital video systems such as monitors and projectors have spread remarkably. Regarding printers, in particular, as the printers have become more sophisticated, they have been used for diverse purposes, while at the same time there has been growing user demand for color matching.

In the print industry, there are thousands of print-media types, with types of material, color tone, gloss, and the like increasing steadily year by year. Among other things, many of the media recently available on the market contain special paints known as fluorescent brighteners to make the media look whiter to the human eye than the intrinsic color tones of the material. Generally, fluorescent brighteners have the property of absorbing light of short wavelengths in the visible to ultraviolet wavelength regions and releasing light on the longer-wavelength side.

Thus the fluorescent brightener, when used in paper, has the effect of causing the white color of the paper to be perceived by the human eye as a white color brighter than the intrinsic color of the paper. On the other hand, in precise color matching done using a color profile or the like, the fluorescent brightener can pose a major problem depending on its amount or characteristics.

The problem stems from changes in apparent spectral reflectance caused by differences between the light source used for measurement and the light source in a viewing environment. Consequently, there is a problem in that if a color profile of a medium containing a fluorescent brightener is created using a typical method, a printed image will not agree with subjective perception, generally showing a strong tinge of yellow.

Techniques proposed to solve the problem include those disclosed in Japanese Patent Laid-Open Nos. 2001-174334 and 2002-139381. First each of the two techniques takes measurements using a special filter which cuts off a short wavelength region. Next the technique takes measurements without the filter. Then the technique calculates a correction factor based on information about the differences between the two types of measurement and makes corrections at an XYZ value level.

However, the conventional techniques described above need to take measurements both with and without the special filter which cuts off a short wavelength region, using different methods. This can cost time. Also, because of the need for a high-precision filter, the techniques cost money and lack versatility and cannot be used generally. Furthermore, since XYZ values are used for all corrections, the techniques provide lower accuracy than methods which use spectral data.

SUMMARY OF THE INVENTION

The present invention provides a method for creating simple and highly accurate profiles by taking into consideration effects of fluorescent brighteners and viewing environment.

According to one aspect of the present invention, there is provided a profile creation method for creating a color profile, comprising: a determination step of determining whether a medium used for printing contains a fluorescent brightener, based on measured values of the medium; a correction step of correcting measured values of color patches formed on the medium, based on a result of the determination; and a creation step of creating the color profile based on the corrected measured values of the color patches and measured values of an ambient light used in measuring the color patches.

According to another aspect of the present invention, there is provided a profile creation apparatus which creates a color profile, comprising: a determination unit which determines whether a medium used for printing contains a fluorescent brightener, based on measured values of the medium; a correction unit which corrects measured values of color patches formed on the medium, based on a result of the determination; and a creation unit which creates the color profile based on the corrected measured values of the color patches and measured values of an ambient light used in measuring the color patches.

Further features of the present invention will become apparent from the following description of exemplary embodiments with reference to the attached drawings.

BRIEF DESCRIPTION OF THE DRAWINGS

FIG. 9 is a flowchart showing a profile generation process according to the present embodiment;

FIG. 10 is a diagram showing a conversion formula into XYZ values;

FIG. 11 is a diagram showing a conversion formula into L*a*b* values;

FIG. 12 is a diagram showing a data structure of a lookup table (LUT) according to the present embodiment.

DESCRIPTION OF THE EMBODIMENTS

An embodiment of the present invention will be described in detail below with reference to the drawings.

In the present embodiment, description will be given of a method for creating a color profile for color matching using a system which includes a personal computer, monitor, and calorimeter.

Figure 1:
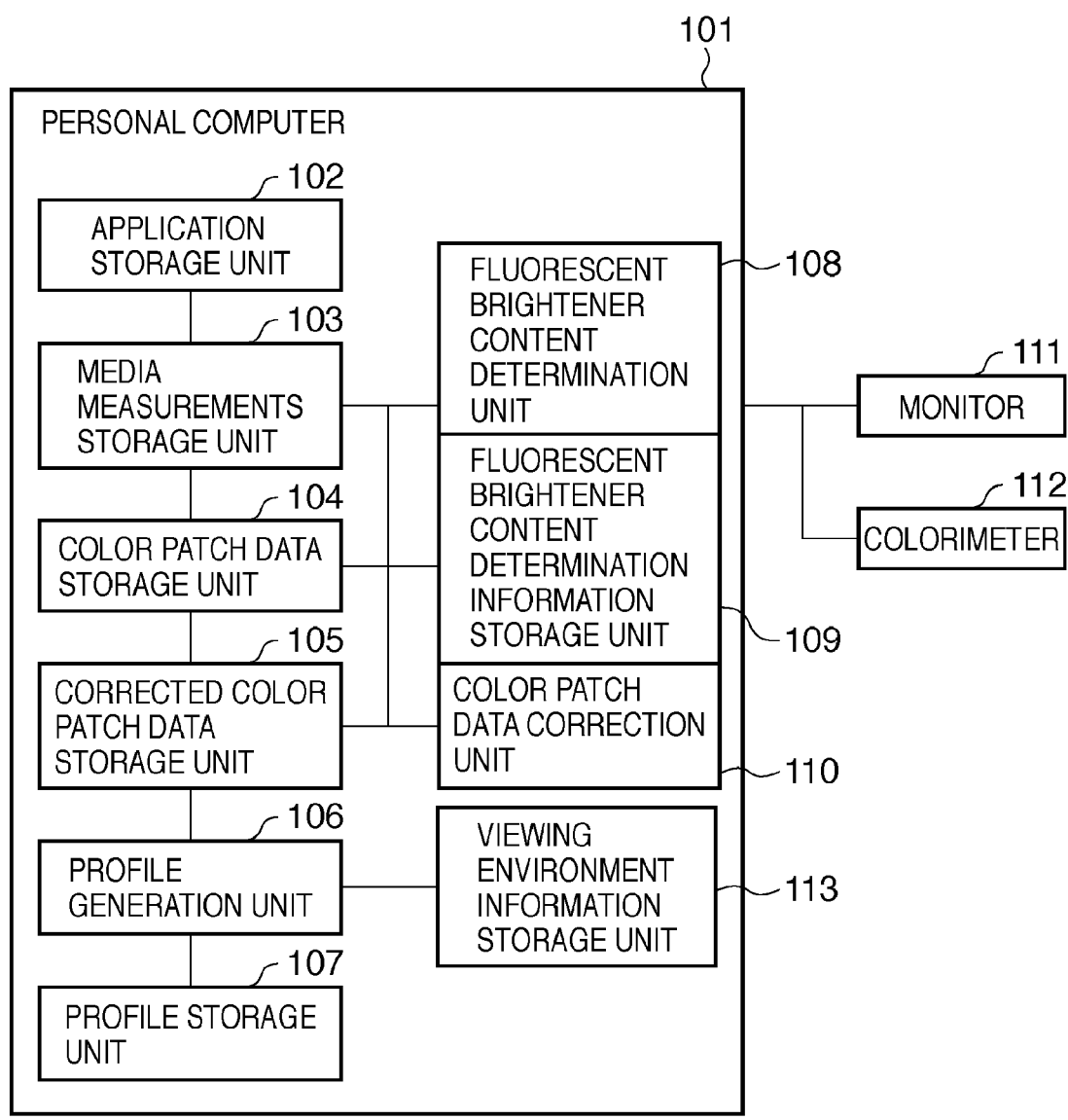
FIG. 1 is a diagram showing an exemplary configuration of a system which performs a profile creation method according to the present embodiment.

FIG. 1 is a diagram showing an exemplary configuration of a system which performs a profile creation method according to the present embodiment. In the system shown in FIG. 1, reference numeral 101 denotes a personal computer, 111 denotes a monitor directly connected to the personal computer 101, and 112 denotes a calorimeter directly connected to the personal computer 101 as in the case of the monitor 111.

The personal computer 101 includes an application storage unit 102, media measurements storage unit 103, color patch data storage unit 104, corrected color patch data storage unit 105, profile generation unit 106, profile storage unit 107, fluorescent brightener content determination unit 108, fluorescent brightener content determination information storage unit 109, color patch data correction unit 110, and viewing environment information storage unit 113.

Now, a brief description will be given of a method for creating a color profile of a medium containing a fluorescent brightener using the above configuration.

First, an application stored in the application storage unit 102 is started by an operating system (OS) program at the direction of a user and is brought up on the monitor 111. The following operations are performed on the started application.

First, the user measures white part of a medium used for printing or specifies existing measured values. The measured values obtained by measurements or specified by the user are stored as fluorescent brightener content in the media measurements storage unit 103. Next, the user measures color patches printed on the medium or specifies existing measured values, the printed color patches being intended for use in creating a color profile. The measured values obtained by measurements or specified by the user are stored in the color patch data storage unit 104.

Next, based on the medium's measured values stored in the media measurements storage unit 103, fluorescent brightener content of the medium is determined, regarding whether or not the medium contains a fluorescent brightener (high content/low content). If it is determined that the medium contains a fluorescent brightener (or has a high fluorescent brightener content), the measured values of the color patches stored in the color patch data storage unit 104 is corrected. On the other hand, if it is determined that the medium does not contain a fluorescent brightener (or has a low fluorescent brightener content), the measured values of the color patches stored in the color patch data storage unit 104 is not corrected.

In either case, the measured values of the color patches are stored once as corrected color patch data in the corrected color patch data storage unit 105.

Next, the user measures a viewing environment in which images are actually viewed or specifies existing measured values. The measured values obtained by measurements or specified by the user are stored as viewing environment information in the viewing environment information storage unit 113. In this case, data on a light source used when the color patches are measured by a printer is stored as viewing environment information in the viewing environment information storage unit 113.

Next, based on the corrected color patch data stored in the corrected color patch data storage unit 105 and viewing environment information stored in the viewing environment information storage unit 113, the profile generation unit 106 generates a profile and stores the profile in the profile storage unit 107.

Figure 2:
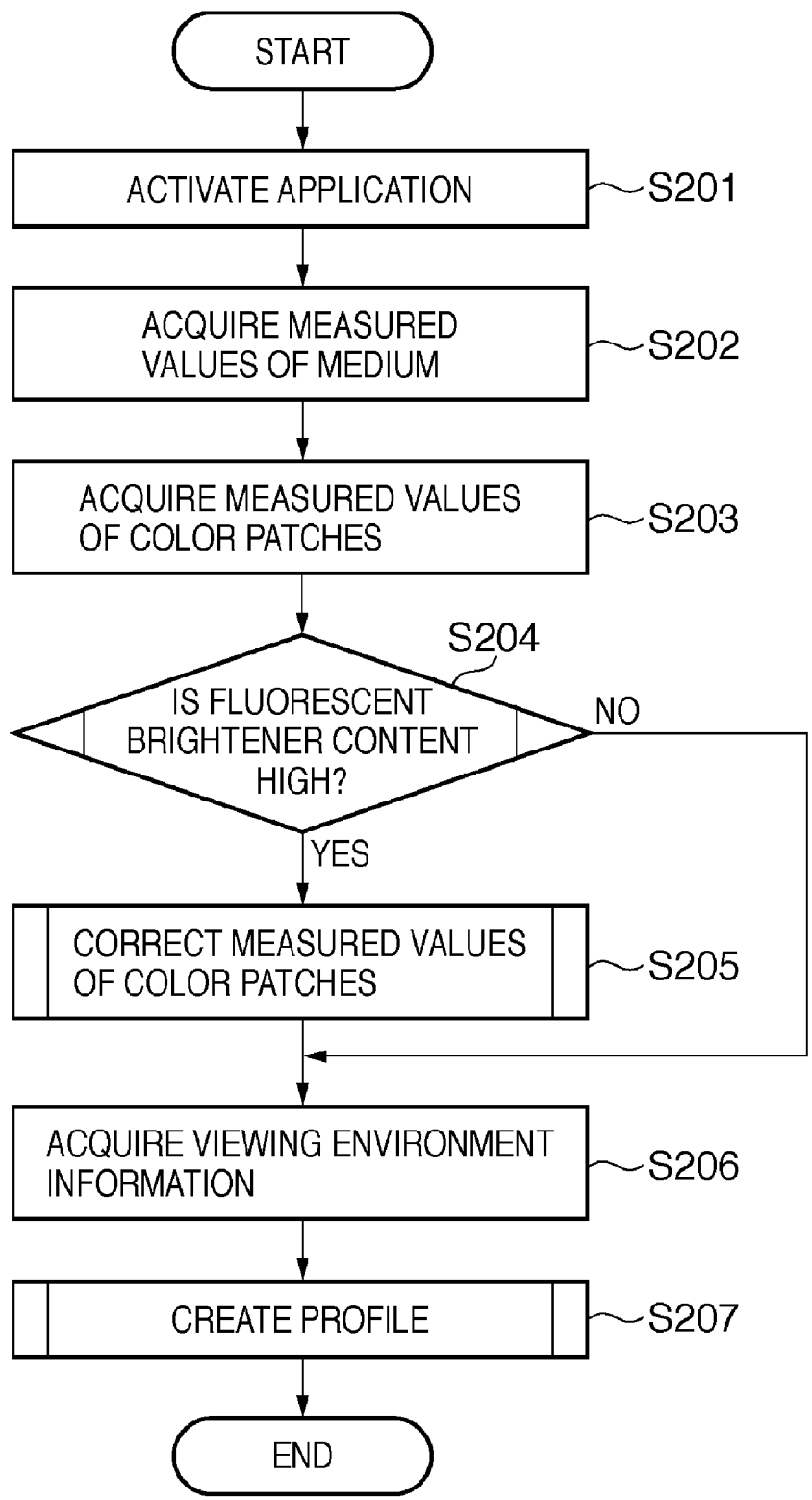
FIG. 2 is a flowchart showing a color profile creation process according to the present embodiment.
Figure 3:
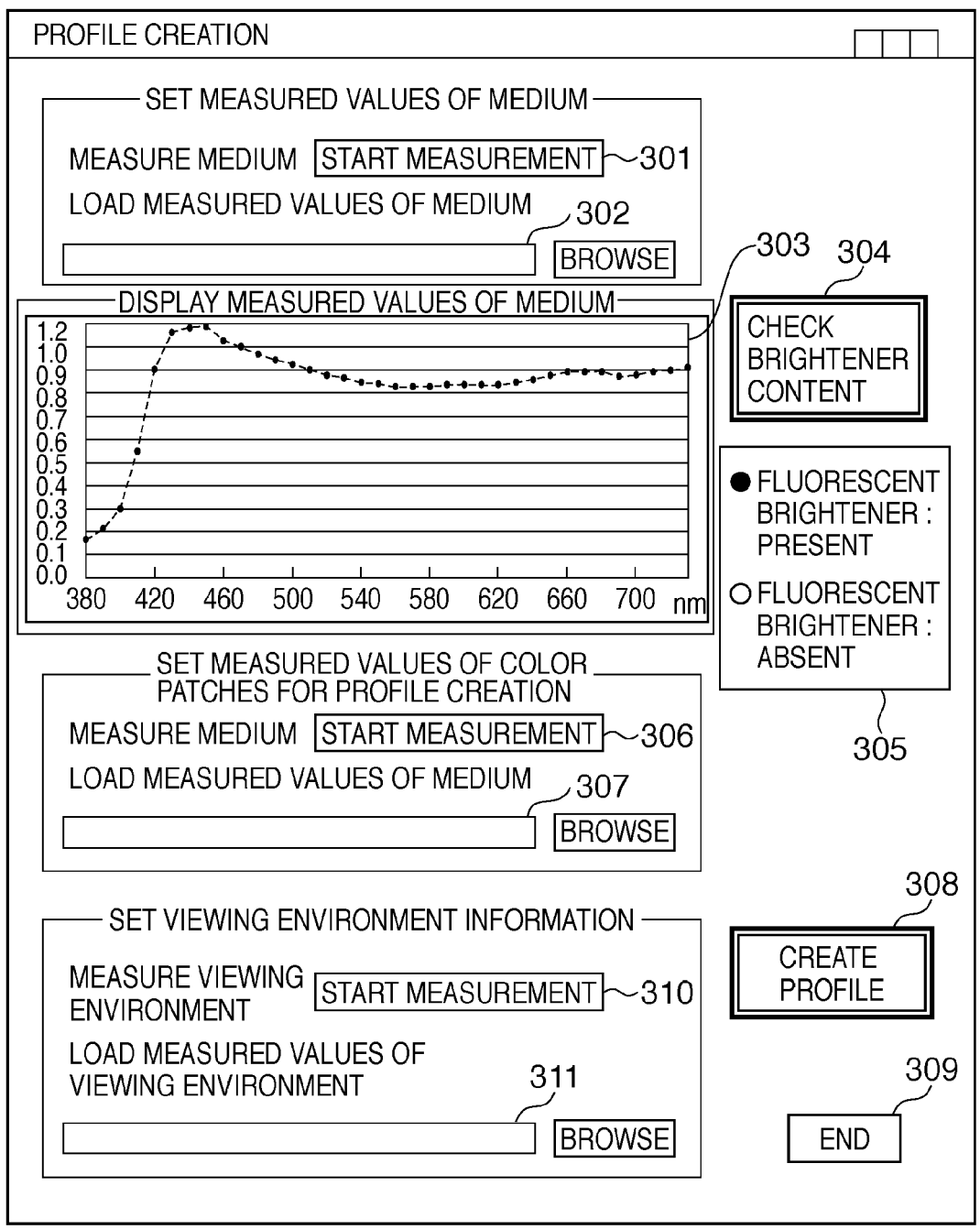
FIG. 3 is a diagram showing an example of a color profile creation screen according to the present embodiment.

Now, a detailed description will be given of a method for creating a color profile of a medium containing a fluorescent brightener, with reference to FIGS. 2 and 3. FIG. 2 is a flowchart showing a color profile creation process according to the present embodiment. FIG. 3 is a diagram showing an example of a color profile creation screen according to the present embodiment.

First, in step S201, a profile creation application (see FIG. 3) stored in the application storage unit 102 is activated. In step S202, measured values of white part in a desired medium used for image output is acquired. Specifically, the user presses a Start Measurement button 301 shown in FIG. 3 to acquire measured values using the calorimeter 112 or fills in a field 302 in FIG. 3 to load existing measured values of the white part in the medium.

The measured values acquired here are values of "spectral reflectance" obtained by spectrometric measurement of the white part in the medium and the calorimeter 112 is capable of measuring "spectral reflectance." The acquired "spectral reflectance" is displayed as measured values of the medium, as exemplified by a spectral waveform 303 shown in FIG. 3. It is assumed here that the calorimeter 112 acquires spectral data by measuring the white part of the medium without using a particular filter.

Next, in step S203, as many measured values of color patches as needed to create a color profile for the printer are acquired. Specifically, the user presses a Start Measurement button 306 shown in FIG. 3 to acquire measured values produced by the calorimeter 112 by measuring the color patches actually outputted on the media from the printer. Alternatively, the user acquires existing measured values of color patches by filling in a field 307 shown in FIG. 3.

The measured values acquired here are values of "spectral reflectance" and the calorimeter 112 is capable of measuring two types of spectral reflectance: spectral reflectance of reflecting objects such as color patches and spectral reflectance of luminous objects such as a viewing illuminant.

Next, in step S204, it is determined whether or not the medium has a high fluorescent brightener content. Specifically, the user presses a Check Brightener Content button 304 shown in FIG. 3 to determine the fluorescent brightener content in the medium based on the medium's measured values acquired in step S202. If it is determined that the fluorescent brightener content is high, the flow goes to step S205. If it is determined that the fluorescent brightener content is low, the flow goes to step S206. The result of determination is indicated by "Brightener: Present" or "Brightener: Absent" as 305 shown in FIG. 3. The process of determining the fluorescent brightener content will be described in detail later.

In step S205, the color patches' measured values acquired in step S203 are corrected. The process of correcting the measured values of the color patches will be described in detail later.

Next, in step S206, measured values of viewing environment are acquired by actually measuring the environment of the printer. Specifically, the user presses a Start Measurement button 310 shown in FIG. 3 to take measurements using the calorimeter 112 or fills in a field 311 shown in FIG. 3 to acquire existing measured values of the viewing environment.

The measured values acquired here are values of "spectral reflectance" and the calorimeter 112 is capable of measuring "spectral reflectance."

Next, in step S207, a profile is created using the color patches' measured values and viewing environment's measured values acquired in steps S203 and S206, respectively. To create the profile, the user presses a Create Profile button 308 shown in FIG. 3. The profile creation process will be described in detail later.

To finish the color profile creation process for the medium containing the fluorescent brightener, the user presses an End button 309 shown in FIG. 3.

Now, the fluorescent brightener determination process in step S204 will be described in detail with reference to FIGS. 4, 5, and 6.

Figure 4:
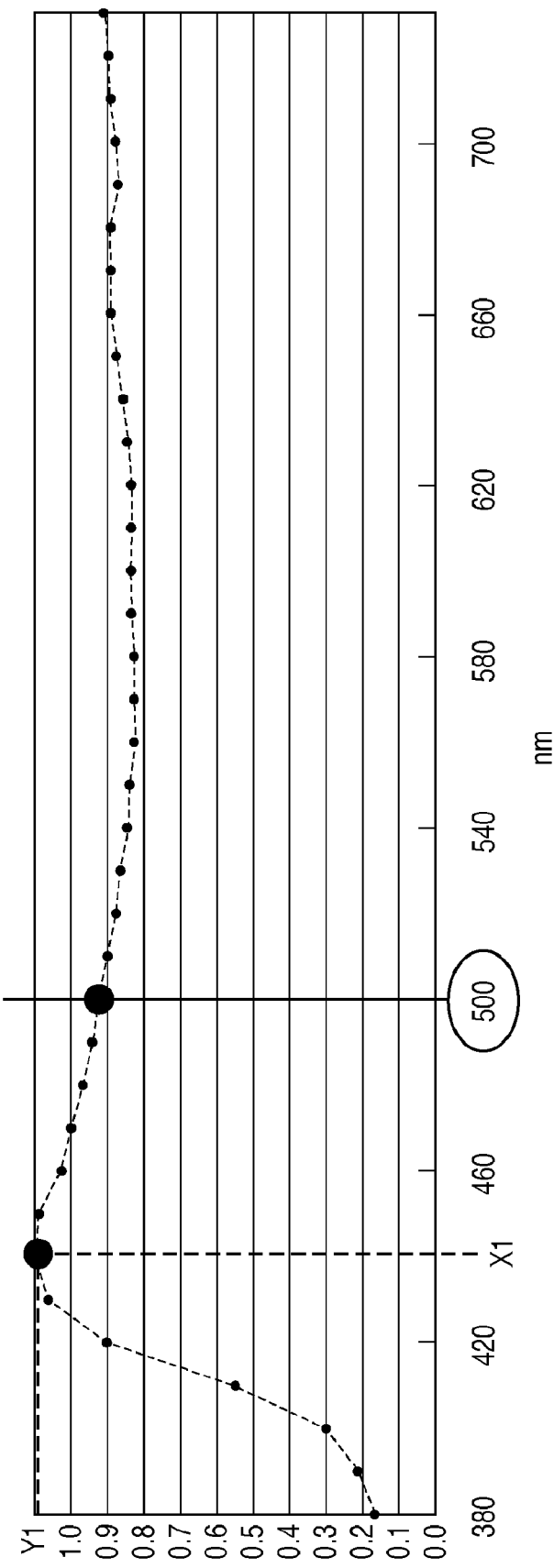
FIG. 4 is a diagram showing a medium's spectral reflectance acquired in step S202.

FIG. 4 is a diagram showing the medium's spectral reflectance acquired in step S202. It is assumed here that a spectral waveform acquired by the calorimeter 112 has wavelengths of 380 nm to 780 nm. In this wavelength range, it is known that diamino stilbene derivatives which are typical fluorescent brighteners absorb 275-nm and 330-nm wavelength energy in the ultraviolet region and release light with a wavelength around 430 nm in the visible region. Thus, according to the present embodiment, with a threshold set to 500 nm, it is assumed that waveforms affected by fluorescent brighteners are detected in a wavelength range of 380 nm to 500 nm.

Although the threshold is set to 500 nm, the threshold can be set as desired according to the type and characteristics of the fluorescent brightener.

Now, a process performed by the fluorescent brightener content determination unit 108 will be described with reference to FIG. 6. FIG. 6 is a flowchart showing a fluorescent brightener determination process according to the present embodiment. First, in step S601, the fluorescent brightener content determination unit 108 acquires spectral reflectance at the threshold wavelength of 500 nm based on measured values stored in the media measurements storage unit 103.

Figure 5:
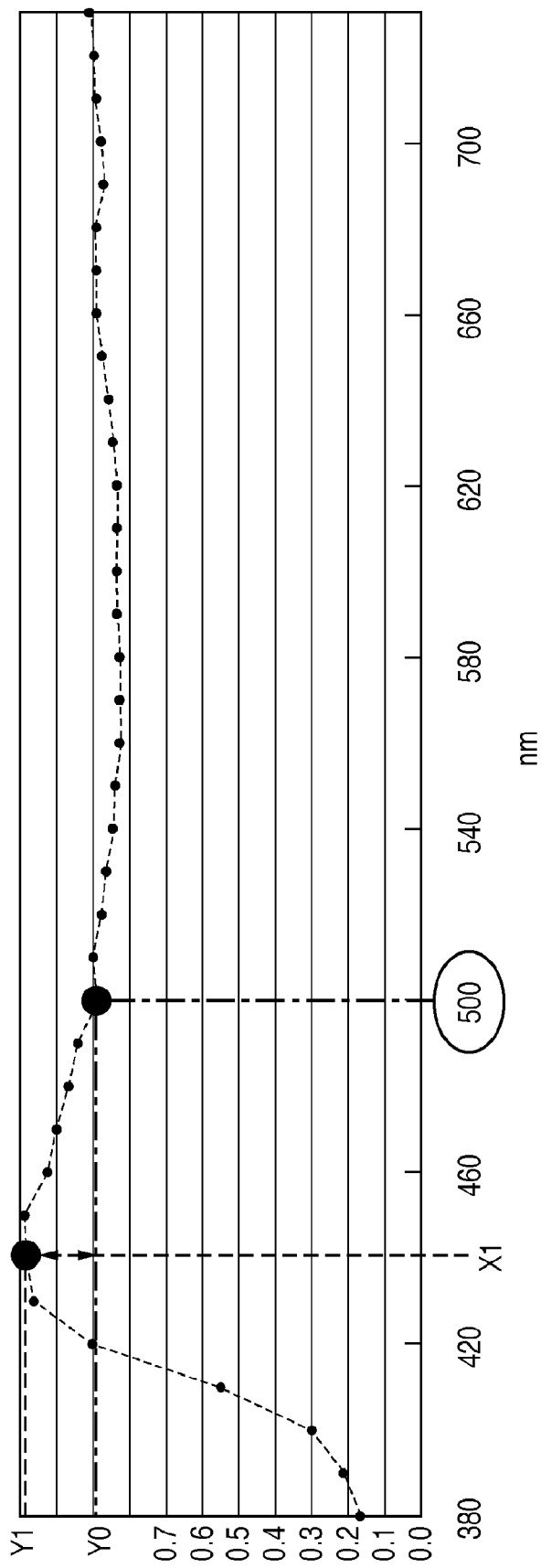
FIG. 5 is a diagram showing spectral reflectance to illustrate a fluorescent brightener content determination process according to the present embodiment.
Figure 6:
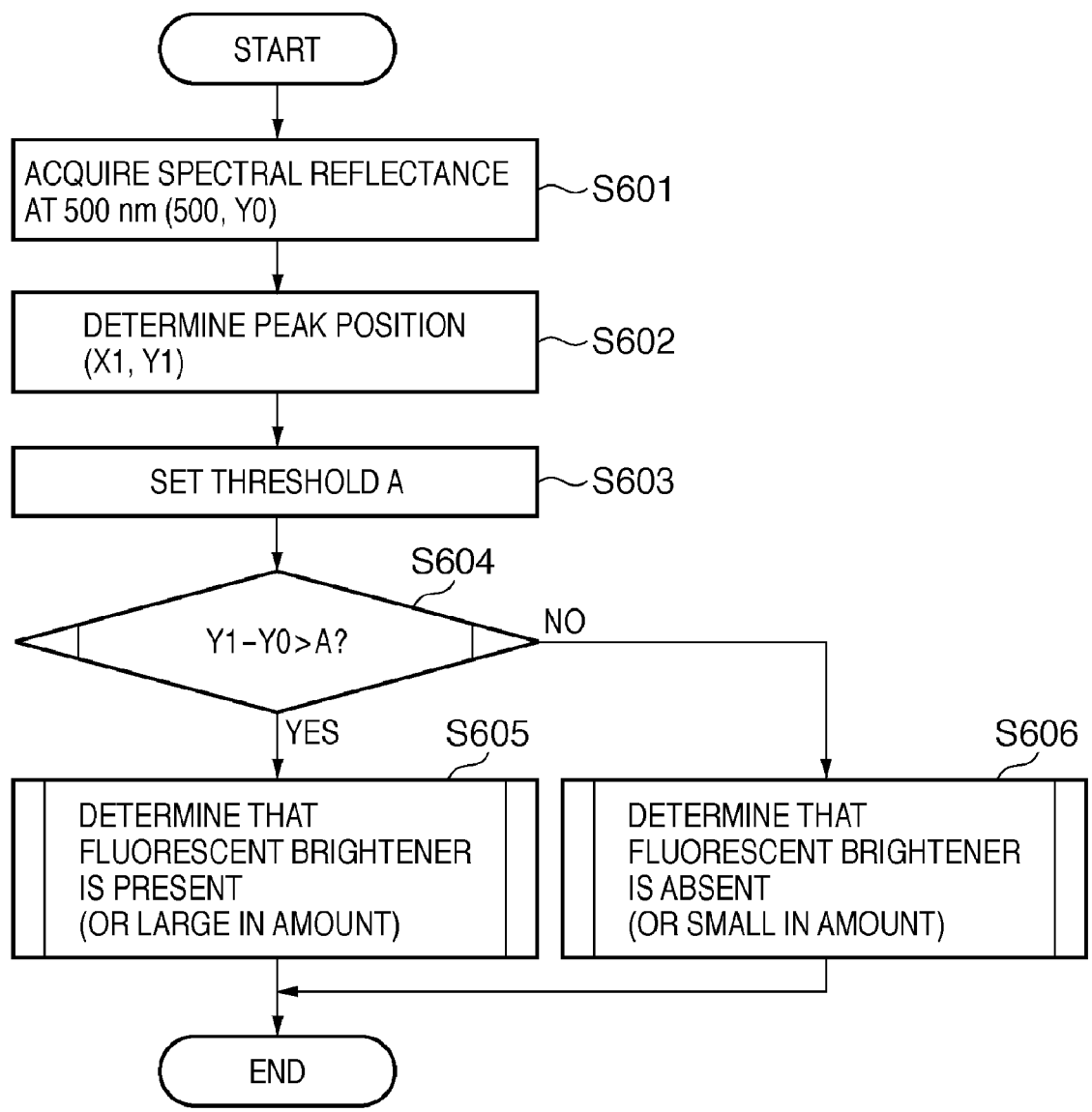
FIG. 6 is a flowchart showing a fluorescent brightener determination process according to the present embodiment.

FIG. 5 is a diagram showing spectral reflectance to illustrate a fluorescent brightener content determination process according to the present embodiment. As shown in FIG. 5, the coordinates of wavelength and spectral reflectance at the threshold wavelength of 500 nm are (500, Y0). Acquired coordinate information is stored in the fluorescent brightener content determination information storage unit 109.

Next, in step S602, the fluorescent brightener content determination unit 108 determines peak position at which the spectral reflectance is the highest (has the largest value) in the wavelength range of 380 nm to 500 nm (threshold), on the spectral waveform. The detected coordinates (X1, Y1) are stored in the fluorescent brightener content determination information storage unit 109 as coordinate information.

Next, in step S603, the fluorescent brightener content determination unit 108 sets a threshold A for use in determination of the fluorescent brightener content. The threshold A may be set arbitrarily. For example, when the threshold A is used for proofing or the like, the spectral reflectance of white part of a reference or target medium may be acquired in advance and the threshold A may be set to the spectral reflectance value which corresponds to the coordinate X1.

Alternatively, the coordinate X1 of the wavelength at which a yellow cast caused by the fluorescent brightener is acceptable may be calculated in advance based on subjective evaluations of the user and the threshold A may be set to the spectral reflectance corresponding to the coordinate X1. Also, the threshold A may be set to ½, ⅓, or ¼ the difference (Y1−Y0) between the spectral reflectance Y1 at the peak position and spectral reflectance Y0 at 500 nm. Then, the established threshold A is stored in the fluorescent brightener content determination information storage unit 109.

Next, in step S604, the fluorescent brightener content determination unit 108 determines the amount (presence or absence) of fluorescent brightener using the values acquired and stored in the fluorescent brightener content determination information storage unit 109 in steps S601 to S603. As shown in FIG. 5, the fluorescent brightener content determination unit 108 determines whether or not the difference between the spectral reflectance Y1 at the peak position X1 acquired in step S602 and spectral reflectance Y0 at 500 nm acquired in step S601 is larger than the threshold A set in S603.

If it is determined that the relationship Y1−Y0>A is satisfied, the fluorescent brightener content determination unit 108 goes to S605. In S605, the fluorescent brightener content determination unit 108 determines that the fluorescent brightener is present (or large in amount), and thereby finishes the process. On the other hand, if Y1−Y0≦A, the fluorescent brightener content determination unit 108 goes to S606. In S606, the fluorescent brightener content determination unit 108 determines that the fluorescent brightener is absent (or small in amount), and thereby finishes the process.

Now, a color patch measurements correction process (step S205) performed by the color patch data correction unit 110 will be described with reference to FIGS. 7 and 8.

Figure 7:
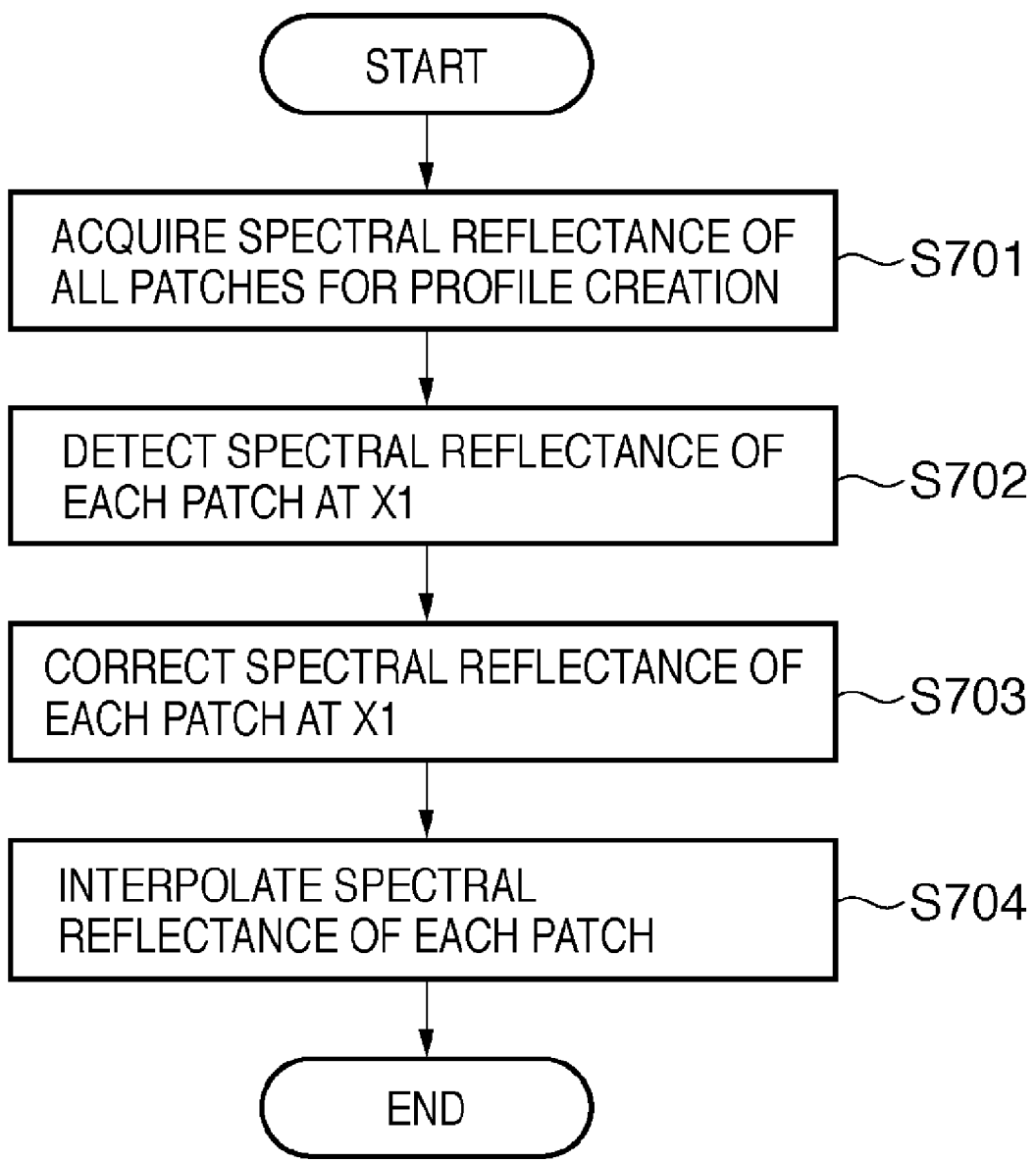
FIG. 7 is a flowchart showing a color patch measurements correction process according to the present embodiment.
Figure 8:
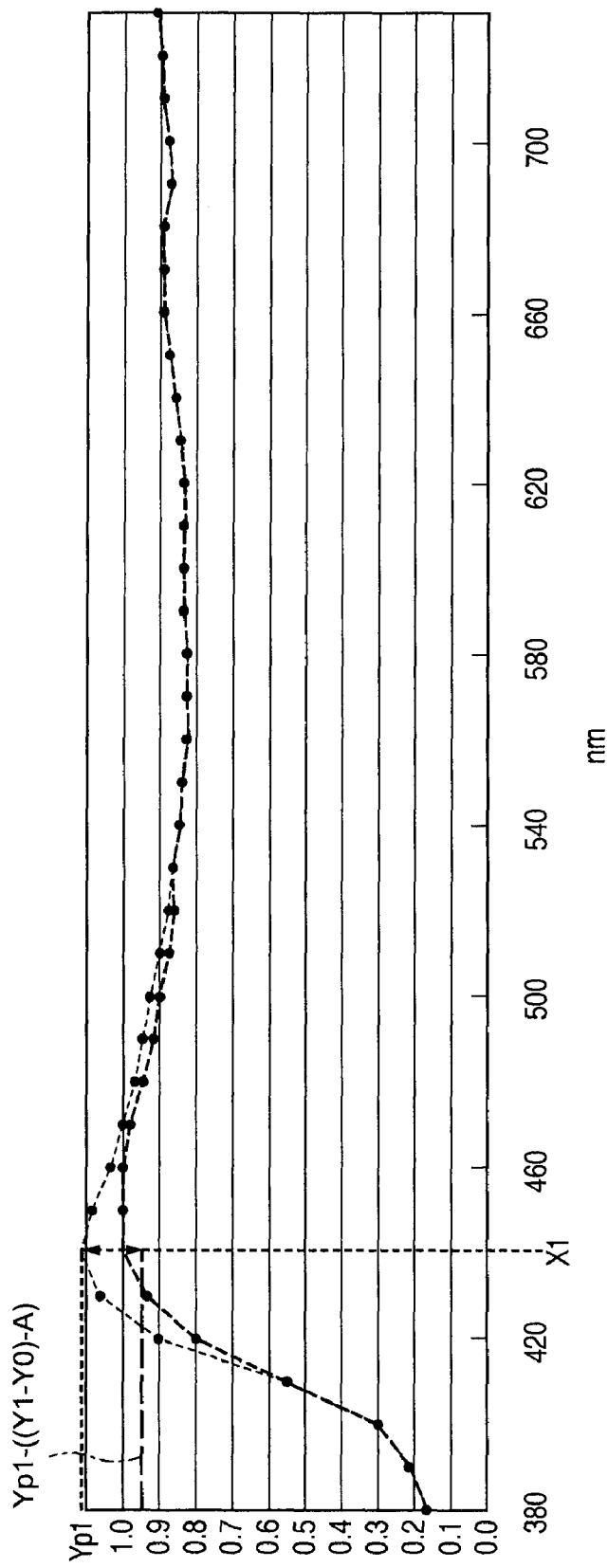
FIG. 8 is a diagram showing spectral reflectance to illustrate the color patch measurements correction process according to the present embodiment.

FIG. 7 is a flowchart showing the color patch measurements correction process according to the present embodiment. First, in step S701, the color patch data correction unit 110 acquires as many measured values (patch data) of color patches as needed to create a profile, from the color patch data storage unit 104. It is assumed that the number of colors needed to create a color profile is 9 cubic slices, that is, 729 colors (9×9×9), in RGB space.

Next, in step S702, from among the spectral reflectance values of each patch acquired in step S701, the color patch data correction unit 110 acquires the value of the spectral reflectance at the peak position X1 stored in the fluorescent brightener content determination information storage unit 109. The spectral reflectance of the patch at the peak position X1 is denoted by Y1.

Next, in step S703, the color patch data correction unit 110 corrects the spectral reflectance value of each patch at coordinate X1 acquired in step S702. The corrections are made to reduce the values of the spectral reflectance because the spectral reflectance at coordinate X1 has been excited under the influence of the fluorescent brightener. Specifically, if the value of the first patch acquired in step S702 is Yp1, the color patch data correction unit 110 reduces Yp1 by ((Y1−Y0)−A) using the values stored in the fluorescent brightener content determination information storage unit 109.

That is, the value of spectral reflectance at coordinate X1 is Yp1−((Y1−Y0)−A). Thus, the corrected coordinates are given by (X1, Yp1−((Y1−Y0)−A)) as shown in FIG. 8. Regarding the remaining patches, the color patch data correction unit 110 similarly reduces the value of spectral reflectance at X1 by ((Y1−Y0)−A).

Next, in step S704, the color patch data correction unit 110 interpolates spectral reflectance of each patch from the spectral reflectance value corrected in step S703. It is assumed here that each patch has 401 values of spectral reflectance corresponding to wavelengths in the range of 380 nm to 780 nm at 1-nm intervals. Using a spline function or the like, the color patch data correction unit 110 interpolates the other 400 spectral reflectance values from the spectral reflectance value at X1 corrected in step S703. Any interpolation method may be used as long as the method can interpolate a smooth curve.

After the correction, the color patch data correction unit 110 stores the spectral reflectance values of patches for 729 colors in the corrected color patch data storage unit 105. After repeating the correction process of color patch data for 729 colors, the color patch data correction unit 110 finishes the correction of the measured values of the color patches.

Now, a profile generation process (step S207) performed by the profile generation unit 106 will be described with reference to FIGS. 9 to 11.

FIG. 9 is a flowchart showing the profile generation process according to the present embodiment. First, in step S901, the profile generation unit 106 acquires as many items of color patch data as needed to create a color profile, from the corrected color patch data storage unit 105. Next, in step S902, the profile generation unit 106 acquires spectral distribution data obtained under the light source used to view images, from the viewing environment information storage unit 113.

Incidentally, the viewing environment information may be obtained by taking measurements in the environment in which the images are actually viewed, using a calorimeter 112 capable of obtaining spectral distribution data. Also, any standard viewing illuminant prescribed by CIE, JIS, or the like may be used alternatively. In the present example, it is assumed that the spectral distribution data of the viewing environment is prestored in the viewing environment information storage unit 113.

Next, in step S903, the profile generation unit 106 multiplies the spectral data obtained in steps S901 and S902 and thereby calculates XYZ values. Specifically, the profile generation unit 106 calculates the XYZ values of color patch data for 729 colors using a formula shown in FIG. 10, where $O(\lambda)$ is the corrected color patch data acquired in step S901 and $S(\lambda)$ is the spectral distribution data of the viewing environment acquired in step S902.

Next, in step S904, using a formula shown in FIG. 11, the profile generation unit 106 converts the XYZ values of 729 colors calculated in step S903 into L*a*b* values and thereby describes the color patch data in profile format. In FIG. 11, X, Y, and Z are the XYZ values of each patch calculated using the formula shown in FIG. 10 and Xn, Yn, and Zn are the XYZ values of the viewing illuminant.

According to the present embodiment, the profile describes a lookup table (LUT) for conversion from device-dependent space into device-independent space. The LUT contains a data structure (FIG. 12) for all the 729 colors to represent correspondence between color coordinate data at grid points in the RGB color space and coordinate values in L*a*b* color space reproduced by the grid points.

Figure 13:
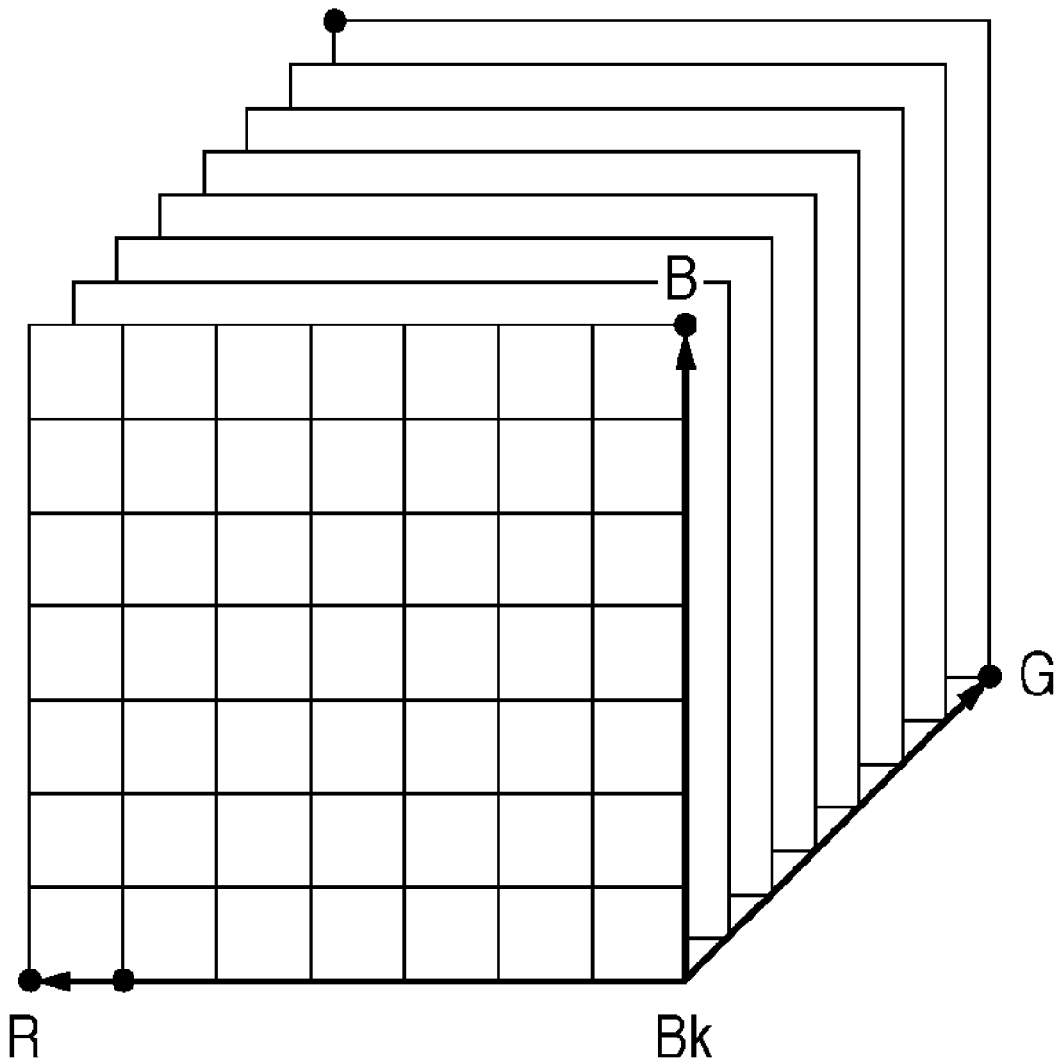
FIG. 13 is a diagram schematically showing the data structure shown in FIG. 12 in an RGB color space.

FIG. 12 is a diagram showing the data structure of the lookup table (LUT) according to the present embodiment. As shown in FIG. 12, intervals of R, G, and B values are described at the beginning of the data structure, followed by L*, a*, and b* color coordinates values at each grid point, which are nested by being arranged in the order R, G, and B. FIG. 13 is a diagram schematically showing the data structure shown in FIG. 12 in the RGB color space.

Incidentally, it has been stated in the present embodiment that the profile is created in the form of a LUT. Alternatively, the profile may be stored as relational expressions regardless of the grid point and table format of the profile.

The present embodiment makes it possible to create a profile which enables optimal image formation in a desired viewing environment even when a medium containing a fluorescent brightener is used.

The present invention may be applied either to a system consisting of two or more apparatus (e.g., a host computer, interface devices, a reader, a printer, and the like) or to equipment consisting of a single apparatus (e.g., a copier, a facsimile machine, or the like).

The object of the present invention can also be achieved by a recording medium containing software program code that implements the functions of the above embodiment: the recording medium is supplied to a system or apparatus, whose computer (or a CPU or MPU) then reads the program code out of the recording medium and executes it.

In that case, the program code itself read out of the computer-readable recording medium will implement the functions of the above embodiment, and the recording medium which stores the program code will constitute the present invention.

Examples of the recording medium used to supply the program code include, for example, a flexible disk, hard disk, optical disk, magneto-optical disk, CD-ROM, CD-R, magnetic tape, non-volatile memory card, and ROM.

Also, the functions of the above embodiment can be implemented not only by the program code read out and executed by the computer, but also by part or all of the actual processing executed according to instructions from the program code by an OS (operating system) running on the computer.

Furthermore, the functions of the above embodiment can also be implemented by part or all of the actual processing executed by a CPU or the like contained in a function expansion card inserted in the computer or a function expansion unit connected to the computer if the processing is performed according to instructions from the program code that has been read out of the recording medium and written into memory on the function expansion card or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-127378, filed May 14, 2008, which is hereby incorporated by reference herein in its entirety.

What is claimed is:

1. A profile creation method for creating a color profile, comprising:

a determination step of determining whether a medium used for printing contains a fluorescent brightener, based on measured values of the medium;

a correction step of correcting measured values of color patches formed on the medium, based on a result of the determination; and a creation step of creating the color profile based on the corrected measured values of the color patches and measured values of an ambient light used in measuring the color patches, wherein the measured values of the medium are values of spectral reflectance obtained by spectrometric measurement of white part in the medium, and the determination in the determination step is performed based on a difference between a highest value of the spectral reflectance and a value of spectral reflectance at a predetermined wavelength, and wherein the measured values of the medium are obtained using a colorimeter without using a special filter which cuts off a short wavelength of less than 500 nm.

2. The profile creation method according to claim 1, wherein in the determination step, it is determined that the medium contains the fluorescent brightener in a case where the difference is larger than a threshold, and that the medium does not contain the fluorescent brightener in another case where the difference is not larger than the threshold.

3. The profile creation method according to claim 2, wherein if it is determined that the medium contains the fluorescent brightener, the measured values of the color patches are corrected in the correction step.

4. The profile creation method according to claim 1, wherein in the creation step, the color profile is created by interpolating from the corrected measured values of the color patches.

5. The profile creation method according to claim 1, wherein in the creation step, data structure of the color profile is created in the form of a lookup table.

6. A profile creation apparatus which creates a color profile, comprising:
- a determination unit which determines whether a medium used for printing contains a fluorescent brightener, based on measured values of the medium;
- a correction unit which corrects measured values of color patches formed on the medium, based on a result of the determination; and
- a creation unit which creates the color profile based on the corrected measured values of the color patches and measured values of an ambient light used in measuring the color patches,
- wherein the measured values of the medium are values of spectral reflectance obtained by spectrometric measurement of white part in the medium, and the determination unit performs the determination based on a difference between a highest value of the spectral reflectance and a value of spectral reflectance at a predetermined wavelength, and
- wherein the measured values of the medium are obtained using a colorimeter without using a special filter which cuts off a short wavelength of less than 500 nm.

7. The profile creation apparatus according to claim 6, wherein the determination unit determines that the medium contains the fluorescent brightener in a case where the difference is larger than a threshold, and that the medium does not contain the fluorescent brightener in another case where the difference is not larger than the threshold.

8. The profile creation apparatus according to claim 7, wherein if the determination unit determines that the medium contains the fluorescent brightener, the correction unit corrects the measured values of the color patches.

9. The profile creation apparatus according to claim 6, wherein the creation unit creates the color profile by interpolating from the corrected measured values of the color patches.

10. The profile creation apparatus according to claim 6, wherein the creation unit creates data structure of the color profile in the form of a lookup table.

11. A non-transitory computer-readable medium storing a program thereon which makes a computer perform the profile creation method according to claim 1.

* * * * *